United States Patent
Chandrasekher et al.

(10) Patent No.: US 11,700,323 B2
(45) Date of Patent: *Jul. 11, 2023

(54) ADAPTIVE PAYLOAD EXTRACTION IN WIRELESS COMMUNICATIONS INVOLVING MULTI-ACCESS ADDRESS PACKETS

(71) Applicant: Aira Technologies, Inc., Saratoga, CA (US)

(72) Inventors: Anand Chandrasekher, Saratoga, CA (US); Ravikiran Gopalan, Cupertino, CA (US); Sandeep Kesireddy, San Jose, CA (US)

(73) Assignee: Aira Technologies, Inc., Saratoga, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/887,345

(22) Filed: Aug. 12, 2022

(65) Prior Publication Data

US 2022/0385746 A1 Dec. 1, 2022

Related U.S. Application Data

(63) Continuation of application No. 17/534,353, filed on Nov. 23, 2021, now Pat. No. 11,477,308, which is a continuation-in-part of application No. 17/135,733, filed on Dec. 28, 2020, now Pat. No. 11,191,049.

(51) Int. Cl.
*H04L 69/22* (2022.01)
*H04L 7/00* (2006.01)
*H04L 69/24* (2022.01)

(52) U.S. Cl.
CPC ............ *H04L 69/22* (2013.01); *H04L 7/0008* (2013.01); *H04L 69/24* (2013.01)

(58) Field of Classification Search
CPC .......................... H04L 69/22; H04L 7/0008
See application file for complete search history.

(56) References Cited

U.S. PATENT DOCUMENTS

| | | | |
|---|---|---|---|
| 7,124,205 B2 | 10/2006 | Craft et al. | |
| 7,447,234 B2 | 11/2008 | Colas et al. | |
| 7,664,883 B2 | 2/2010 | Craft et al. | |
| 10,491,569 B1* | 11/2019 | Powell, III | H04L 61/2596 |
| 11,191,049 B1 | 11/2021 | Chandrasekher et al. | |
| 11,477,308 B2 | 10/2022 | Chandrasekher et al. | |
| 2002/0026523 A1 | 2/2002 | Mallory et al. | |
| 2004/0170120 A1 | 9/2004 | Reunamaki et al. | |
| 2006/0047862 A1 | 3/2006 | Shearer et al. | |
| 2009/0086711 A1 | 4/2009 | Capretta et al. | |
| 2010/0309924 A1* | 12/2010 | Harrison | H04L 12/4633 709/236 |

(Continued)

*Primary Examiner* — Brian D Nguyen
(74) *Attorney, Agent, or Firm* — Carr & Ferrell LLP

(57) ABSTRACT

Adaptive payload extraction in wireless communications involving multi-access address packets are described herein. A device can be configured to detect a synchronization sequence of a nested data packet, the nested data packet having synchronization sequences placed in series ahead of a payload, the synchronization sequences including the synchronization sequence; evaluate blocks after the synchronization sequence in the nested data packet to identify the blocks as either additional ones of the synchronization sequences or the payload in the nested data packet; and extract the payload.

15 Claims, 13 Drawing Sheets

(56) References Cited

U.S. PATENT DOCUMENTS

| | | |
|---|---|---|
| 2011/0206019 A1 | 8/2011 | Zhai et al. |
| 2011/0216787 A1 | 9/2011 | Ai et al. |
| 2016/0006842 A1 | 1/2016 | Tahir |
| 2017/0006616 A1 | 1/2017 | Singh et al. |
| 2018/0013808 A1 | 1/2018 | Petry et al. |
| 2018/0359811 A1 | 12/2018 | Verzun et al. |
| 2019/0037052 A1 | 1/2019 | Deshpande |
| 2019/0097914 A1 | 3/2019 | Zhong et al. |
| 2020/0112543 A1* | 4/2020 | Weed ................. H04L 63/0407 |
| 2020/0182303 A1* | 6/2020 | Biegner ................ F16C 41/00 |
| 2020/0195549 A1* | 6/2020 | Ding ..................... H04L 45/64 |
| 2020/0212943 A1* | 7/2020 | Banin .................. H04L 1/1607 |
| 2020/0213152 A1* | 7/2020 | Choquette ............ H04L 63/029 |
| 2020/0383169 A1 | 12/2020 | Takahashi et al. |
| 2021/0014939 A1 | 1/2021 | Verzun et al. |
| 2021/0056058 A1 | 2/2021 | Lee et al. |
| 2021/0120440 A1 | 4/2021 | Reimann et al. |
| 2021/0126989 A1* | 4/2021 | Amend ............... H04L 65/1069 |
| 2022/0210250 A1 | 6/2022 | Chandrasekher et al. |

* cited by examiner

ADAPTIVE PAYLOAD EXTRACTION IN WIRELESS COMMUNICATIONS INVOLVING MULTI-ACCESS ADDRESS PACKETS

CROSS-REFERENCE TO RELATED APPLICATIONS

This application is a continuation application of U.S. Nonprovisional patent application Ser. No. 17/534,353, filed Nov. 23, 2021, now U.S. Pat. No. 11,477,308, issued on Oct. 18, 2022, entitled "ADAPTIVE PAYLOAD EXTRACTION IN WIRELESS COMMUNICATIONS INVOLVING MULTI-ACCESS ADDRESS PACKETS," which is a continuation-in-part of U.S. patent application Ser. No. 17/135,733, filed on Dec. 28, 2020, now U.S. Pat. No. 11,191,049, issued on Nov. 30, 2021, titled "SYSTEMS AND METHODS FOR IMPROVING WIRELESS PERFORMANCE", all of which is hereby incorporated by reference herein in their entireties, including all references and appendices cited therein, for all purposes, as if fully set forth herein.

FIELD OF THE PRESENT TECHNOLOGY

The present disclosure pertains to the technical field of wireless communications, and more specifically, but not by way of limitation, to systems and methods that improve wireless performance using, for example, redundant access address blocks in data packets to mitigate deleterious effects caused by attenuation and/or noise. Additionally, systems and methods are disclosed that are configured to extract payloads accurately and efficiently from multi-access address packets.

SUMMARY

An example embodiment can include a method comprising detecting a synchronization sequence of a nested data packet, the nested data packet comprising synchronization sequences placed in series ahead of a payload, the synchronization sequences including the synchronization sequence; evaluating blocks after the synchronization sequence in the nested data packet to identify the blocks as either additional ones of the synchronization sequences or the payload in the nested data packet; and extracting the payload.

An example embodiment can include a method comprising detecting a synchronization sequence of a nested data packet, the nested data packet comprising a plurality of synchronization sequences placed in series ahead of a payload; selectively adjusting an adaptive threshold based on channel quality; and extracting the payload by identifying, based on hamming distance measurement, one or more of the plurality of synchronization sequences that match the synchronization sequence, using the adaptive threshold.

An example embodiment of a device includes a processor that is configured to detect an access address of a nested data packet, the nested data packet comprising access addresses placed in series ahead of a payload, the access addresses comprising the access address; evaluate blocks after the access address in the nested data packet to identify the blocks as either additional ones of the access addresses or the payload in the nested data packet using a threshold comparison; and extract the payload.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Overview

Generally, the present disclosure pertains to the technical field of wireless communications, and more specifically, but not by way of limitation, to systems and methods that improve wireless performance using, for example, redundant synchronization sequence information in data packets to mitigate deleterious effects caused by attenuation and/or noise. These systems and methods can improve wireless performance of a wireless connection that utilizes, for example, BLUETOOTH, or other similar protocol(s).

For context, data packets transmitted over wireless connections can experience loss based on attenuation and/or noise. Attenuation is often proportional to the distance between a transmitter and a receiver. Noise can include any type of signal degradation. Thus, as distance increases, the error rate in the transmission of data packets increases.

The systems and methods disclosed herein can mitigate this increase in error rate caused by attenuation and/or noise in a wireless connection used by a transmitter and receiver. When the transmitter is transmitting data packets over a wireless connection to the receiver, the attenuation and/or noise may result in the data packets not being 'seen' or acquired by the receiver. That is, the receiver is looking for data packets and may miss some or all of the data packets transmitted because the receiver cannot 'see' or acquire the data packets.

Figure 1:
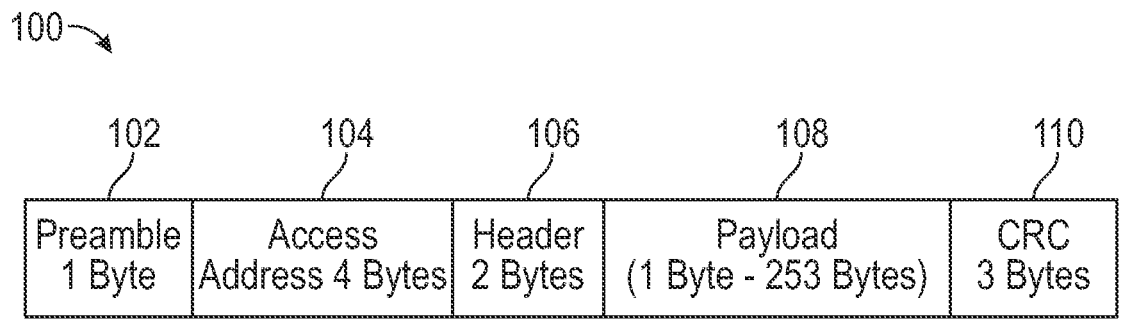
FIG. 1 schematically illustrates an example of prior art data packet.

FIG. 1 illustrates an example structure of an example prior art data packet 100. The example prior art data packet 100 includes a preamble 102, an access address 104, a header 106, a payload 108, and a cyclic redundancy code (CRC 110). The preamble 102 is a bit pattern that is typically used for the RF (radio frequency) to ramp-up. Depending on the implementation it could also be used to estimate frequency offsets and other RF parameters. The access address 104 is used to detect if this particular packet is meant to be processed by the receiver or not. If the access address is not what the receiver is looking for, then it will discard the data packet 100. The header 106 informs the receiver about the length and type of the packet. The payload 108 is the main data component of the data packet 100 which is determined by the application. In LE1M (an example BLUETOOTH packet format) the payload is not coded by a forward error-correcting code. The CRC 110 allows the receiver to determine if the data packet 100 has errors. It will be understood that some protocols may not utilize access address information, but a similar equivalent. The systems and methods herein can be used for these protocols as well. In some instances, the number of bytes in the various fields can be slightly different depending on whether the physical layer (PHY) is 1M (one megabit per second) or 2M (two megabits per second).

With respect to BLUETOOTH, various events may be recognized. For example, a successful acquisition occurs when a data packet was acquired and a header was decoded correctly. A block is defined as the payload and CRC. An Acquisition error occurs when a packet did not have a successful acquisition. A bit error occurs when a bit was received incorrectly. A block error occurs when at least one bit error is present in a block. A CRC error (also known as a block error) occurs when the received CRC does not match with CRC calculated over the received payload. A packet error occurs when the packet had an acquisition error or block error.

Various metrics can be calculated related to the transmission of data packets that include: BER which is a sum of the number of errors in a block with successful acquisition divided by the sum of the number of bits in the block with successful acquisition; BLER which is the number of packets with block error and successful acquisition divided by the number of packets with successful acquisition; AER is the number of packets with an acquisition error divided by the total number of packets; CER (should be same as BLER) is the number of packets with a CRC error and successful acquisition, divided by the number of packets with successful acquisition; PER (should be same as BLER+AER is the number of packets with packet error divided by the number of packets; Packet Retransmission Rate is the average number of times a packet is transmitted before CRC pass; and Block Retransmission Rate (should be same as 1/BLER) is the average number of times a packet is transmitted because of block error before CRC pass. Typically when there is an acquisition error, the receiver cannot detect a data packet, so it will not send an acknowledgment back to the transmitter. This typically results in the transmitter retransmitting the data packet.

Figure 2:
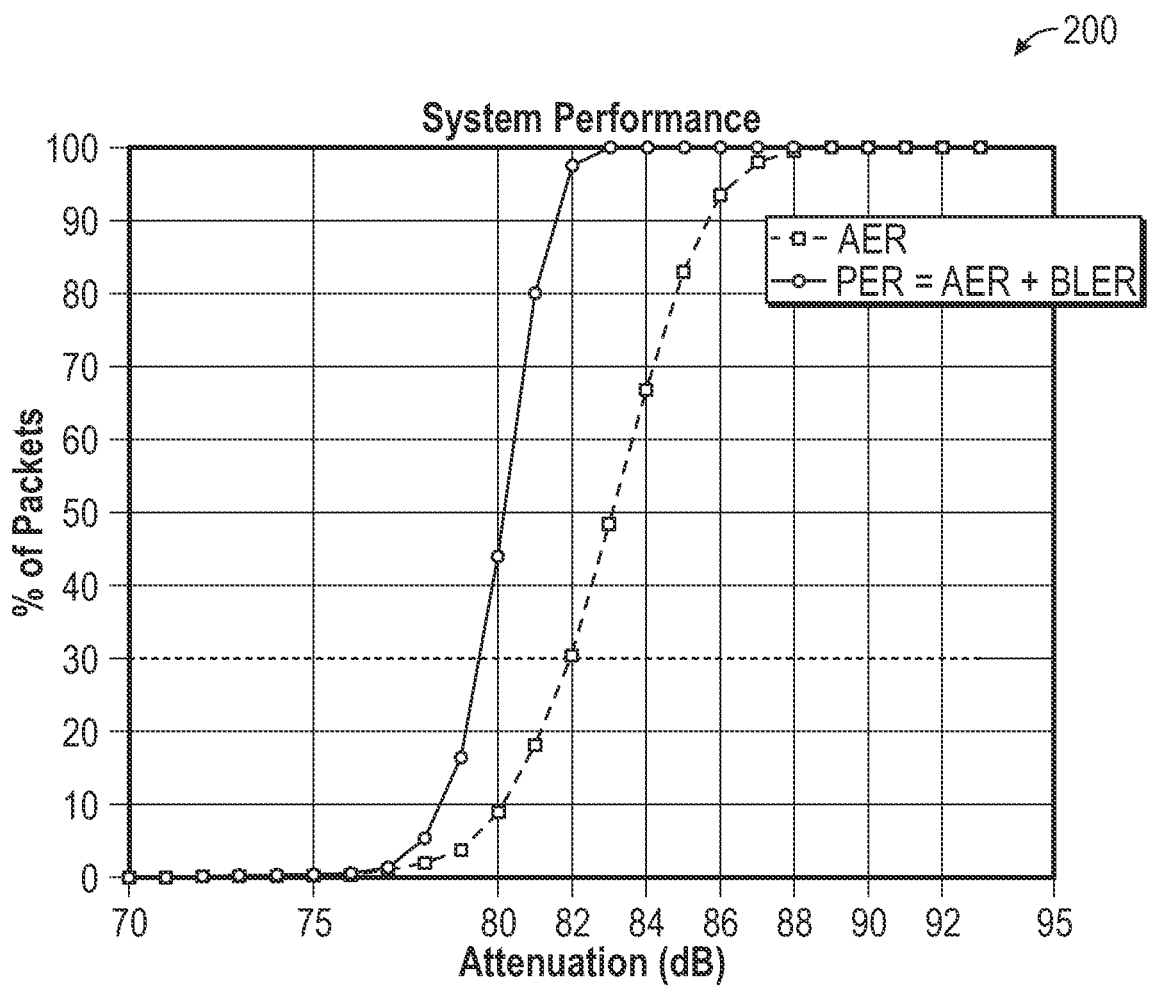
FIG. 2 is a plot of packet error rates versus attenuation and/or noise created for an example prior art data packet.

Typically when there is a CRC error, the receiver cannot ascertain the validity of the payload, so it will not send an acknowledgment (ACK) back to the transmitter. The receiver might even send a NACK. This typically results in the transmitter retransmitting the data packet. FIG. 2 is a plot 200 of AER and PER as a function of attenuation (distance) and/or noise. Typically, the range of a wireless system is dependent on the PER. For example, the range could be defined as the maximum distance where PER=30%. To be sure, this PER depends both on AER and BLER, since PER=AER+BLER.

Generally, the systems and methods herein can improve PER by moving the PER curve to the right (i.e., reduce the PER for any given attenuation and/or noise), which can result in a greater range for the wireless system.

In general, PER can be improved in various ways. First, AER can be improved. That is, AER can be reduced for any given attenuation and/or noise while keeping BLER the same. Therefore, the attenuation and/or noise where PER=30% is now greater, since PER=AER+BLER. Second, BLER can be improved. For example, BLER can be reduced for any given attenuation and/or noise while keeping AER the same. Therefore the attenuation and/or noise where PER=30% is now greater, since PER=AER+BLER. Third, improvements to both AER and BLER can improve PER.

The systems and methods herein can improve the communications between a transmitter and receiver by creating data packets with nested or redundant access address data (or equivalent per other protocol). Thus, a data packet can include two or more sets of access address information. The presence of these multiple sets of access address information can be used to increase the likelihood of a successful acquisition by the receiver.

In some instances, the data packet can include two or more sets of synchronization sequences. A synchronization sequence can include any combination of preamble, access address, and header. According to some embodiments, the attenuation and/or noise noted above can be further mitigated by incorporating forward error correction into the nested data packet. These and other advantages of the present disclosure are provided herein with reference to the collective drawings.

Example Embodiments

Figure 3:
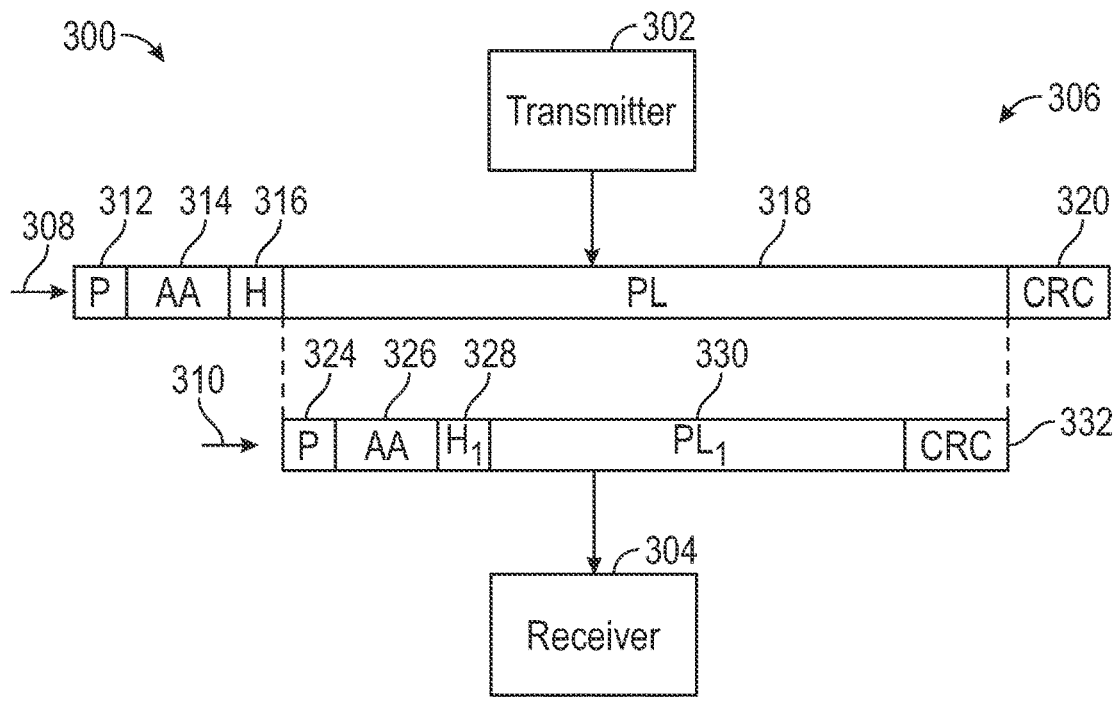
FIG. 3 depicts an illustrative schematic in which techniques and structures for providing the systems and methods disclosed herein may be implemented related to improved wireless performance.

Turning now to the drawings, FIG. 3 depicts an illustrative schematic architecture 300 in which techniques and structures for providing the systems and methods disclosed herein may be implemented. As noted above, the architecture 300 can be implemented in BLUETOOTH communications. The architecture 300 can include a transmitter 302 (e.g., encoder) and a receiver 304 (e.g., decoder). The transmitter 302 can generate a nested or redundant data packet (referred to herein as multi-AA packet 306). An improvement in AER can be achieved using multi-AA data packets.

In some embodiments, the multi-AA packet 306 is created by modifying the payload of a typical data packet. For example, the multi-AA packet 306 can be created by modifying a first data packet 308 with a second data packet 310. The first data packet 308 includes a first preamble 312, a first access address 314, a first header 316, a first payload 318, and a first CRC 320. The first preamble 312, first access address 314, and first header 316 may be referred to generally as a first synchronization sequence. A second data packet 310 can be nested within the first data packet 308. For example, the second data packet 310 can be nested into the first payload 318 of the first data packet 308. As noted above, the synchronization sequence is what the receiver (see receiver 304 of FIG. 3) can use to identify a data packet and lock onto the data packet. If the receiver does not 'see' the data packet then the data is lost and packet errors are realized.

The second data packet 310 can also include a second preamble 324, a second access address 326, a second header 328, a second payload 330, and a second CRC 332. The second preamble 324, second access address 326, and second header 328 form a second synchronization sequence. In some instances, the second (or last nested payload) is referred to as a target payload. That is, the target payload is the payload that is recovered and read by the receiver. As noted above, the target payload can be smaller in size than the payload of the first data packet of the multi-AA data packet.

Structurally, the first synchronization sequence of the first data packet 308 and the second synchronization sequence of the second data packet 310 are arranged in series or sequentially such that the second synchronization sequence appears directly after the first synchronization sequence. In some instances, the second synchronization sequence may omit the second preamble 324. It will be understood that the second payload 330 may be a smaller or truncated version of the first payload 318.

Figure 4:
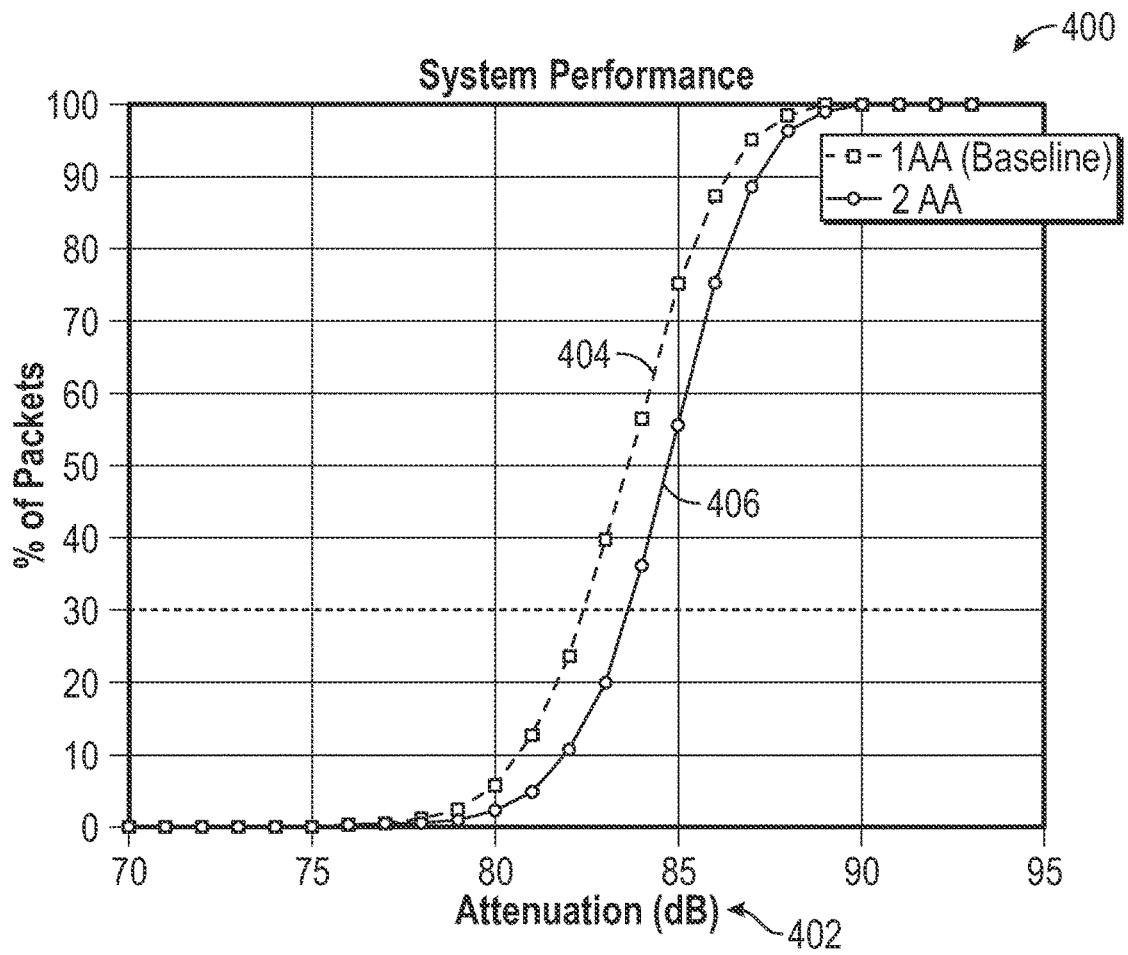
FIG. 4 is a plot of packet error rates versus attenuation and/or noise for a baseline curve and a multi-access address data packet curve.

In general, the second payload 330 becomes the actual payload of the multi-AA packet 306. The second header 328 becomes the actual header of the multi-AA packet 306, and the multi-AA packet 306 has an effective header that has a length that is the combined length of the second payload 330, the second CRC 332, the second preamble 324, the second access address 326, and the first CRC 320. FIG. 4 illustrates a plot 400 where the use of the multi-AA packets has shifted curves along the attenuation axis 402. For example, curve 404 is a baseline plot of AER using data packets with a single access address. Curve 406 is a plot of AER using data packets with two access address blocks (multi-AA packets).

Figure 5:
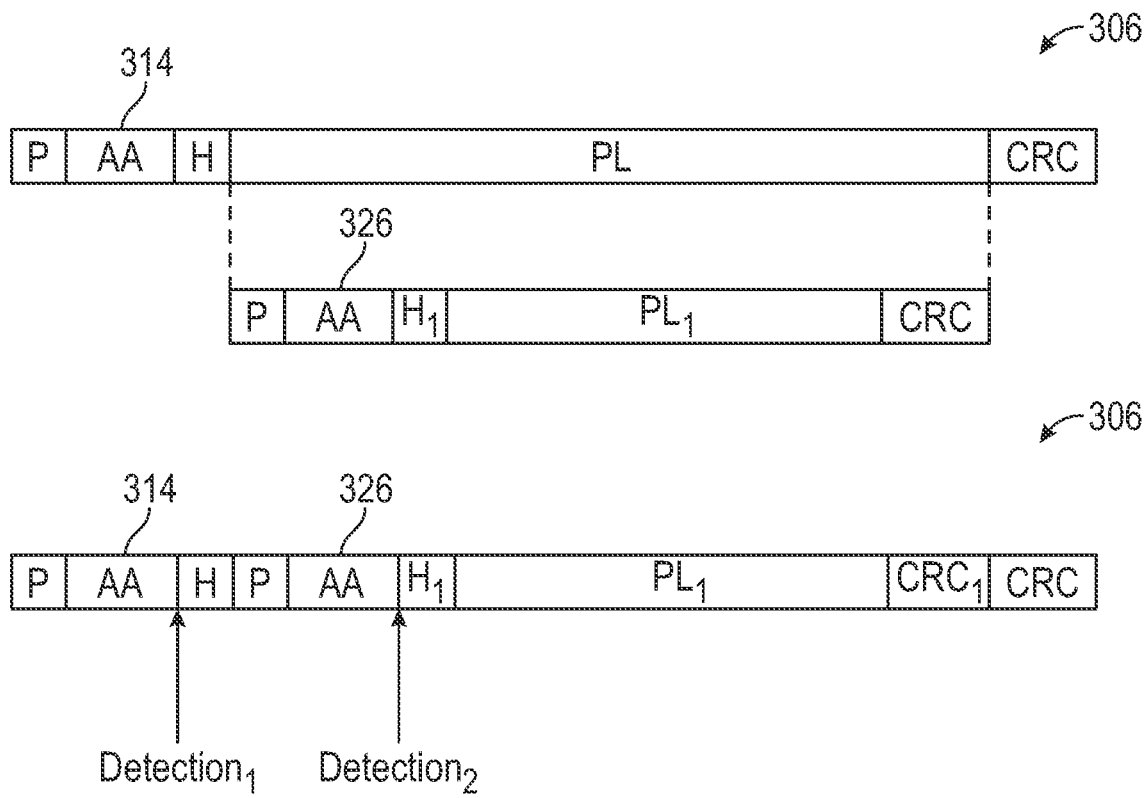
FIG. 5 schematically illustrates the creation of a multi-access address data packet.

Referring now to FIG. 5, a receiver (such as the receiver 304 of FIG. 3) can be configured to process multi-AA packets. The receiver can detect the presence of a multi-AA packet 306 by detecting access address blocks such as the first access address 314 or the second access address 326. Thus, rather than having a single opportunity to detect a single access address block, the receiver has multiple opportunities to detect one of a plurality of access address blocks found in the multi-AA packet 306. The receiver can detect an access address at two detection points: Detection_1 and Detection_2. If the access address is detected at Detection_2, the receiver would end at CRC_1 and the Actual Payload PL_1 is detected. If AA is detected at Detection_1, the receiver processing would end at CRC and the receiver would detect PL=P+AA+H_1+PL_1+CRC_1 as the payload.

Detection_1 event can be identified because the second preamble 324 and the second access address 326 are known bit sequences. Once identified, the second preamble 324, the second access address 326 and the second CRC 332 (always three Bytes long) can be stripped out of the first payload 318 and discarded to obtain the second payload 330. Again, this second payload 330 may be referred to as a target payload.

Figure 6:
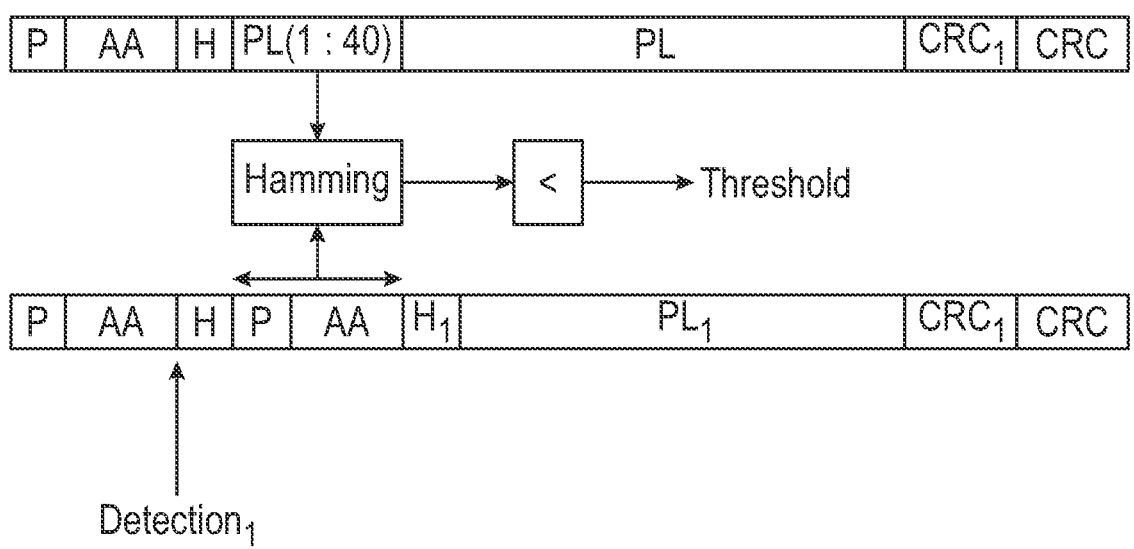
FIG. 6 schematically illustrates a process of detecting access address blocks in a multi-access address data packet.

FIGS. 5 and 6 collectively disclose access address identification processes by a receiver. To identify Detection_1, it will be understood that a length of a preamble and an access address is five Bytes=40 Bits. To be sure, this example references BLUETOOTH standards and is not intended to be limiting. The bit pattern for a preamble and an access address may be defined as PAT. The receiver can find the hamming distance between the first payload 318(1:40) and PAT as Hamming (PL(1:40), PAT). Detection_1 is identified if Hamming(PL(1:40), PAT)<THRESHOLD. To be sure, the THRESHOLD can be optimized for performance.

Figure 7:
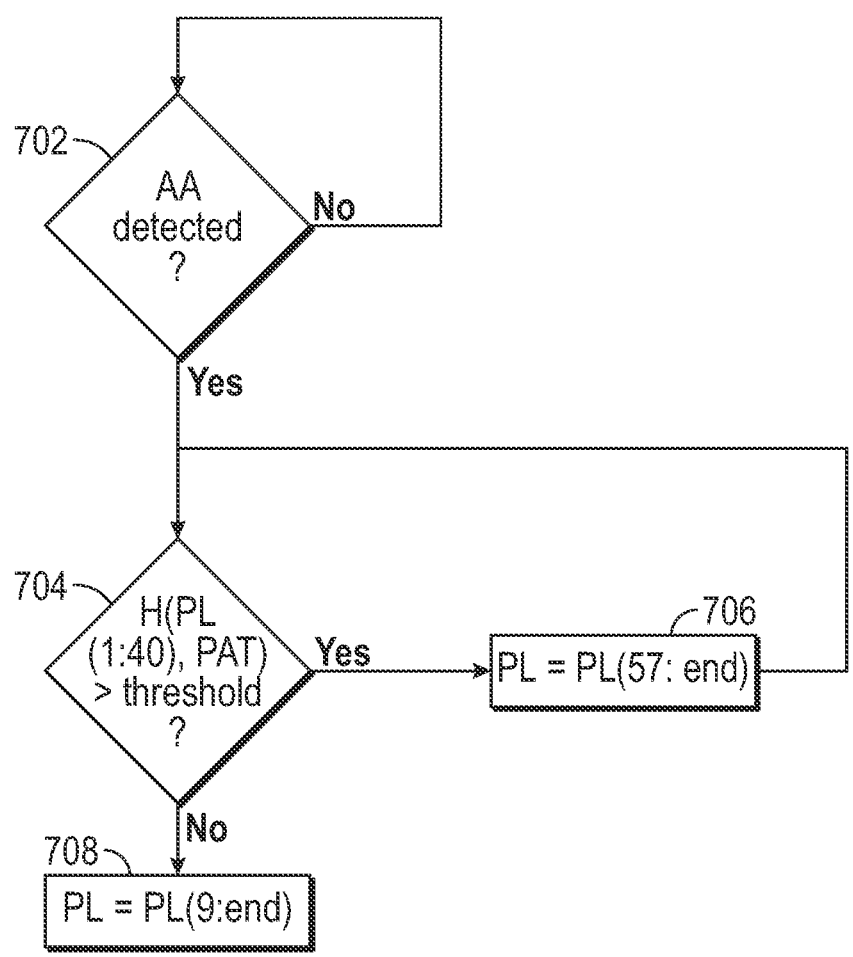
FIG. 7 is a flowchart of an example method of detecting access address blocks in a multi-access address data packet.

FIG. 7 illustrates a flow diagram for a process of extracting a payload, such as the second payload 330 from a multi-AA packet. In step 702, a determination is made as to whether an access address block has been detected. If not, the process repeats until an access address block is detected. Next, in step 704, a determination is made as to whether Hamming(PL(1:40), PAT)<THRESHOLD. If so, step 706 includes reading the payload from bit 57 to the end of the data packet. If not, the method includes a step 708 of reading from bit nine to the end of the data packet. To be sure, if Hamming(PL(1:40), PAT)<THRESHOLD then Detection) has occurred. For example, the first part of the payload (H+P+AA+H1) is discarded. That is, only the bits after H1 are utilized. However, if Hamming(PL(1:40), PAT) <THRESHOLD is NOT true the Detection 2 has happened. For example, the first part of the payload does not need to be discarded, so the H1 can be discarded and the bits after H1 are utilized. The foregoing example is indicative of detection process for methods related to BLUETOOTH communications. The exact parameters of this detection process may vary according to the communication protocol involved.

Figure 8:
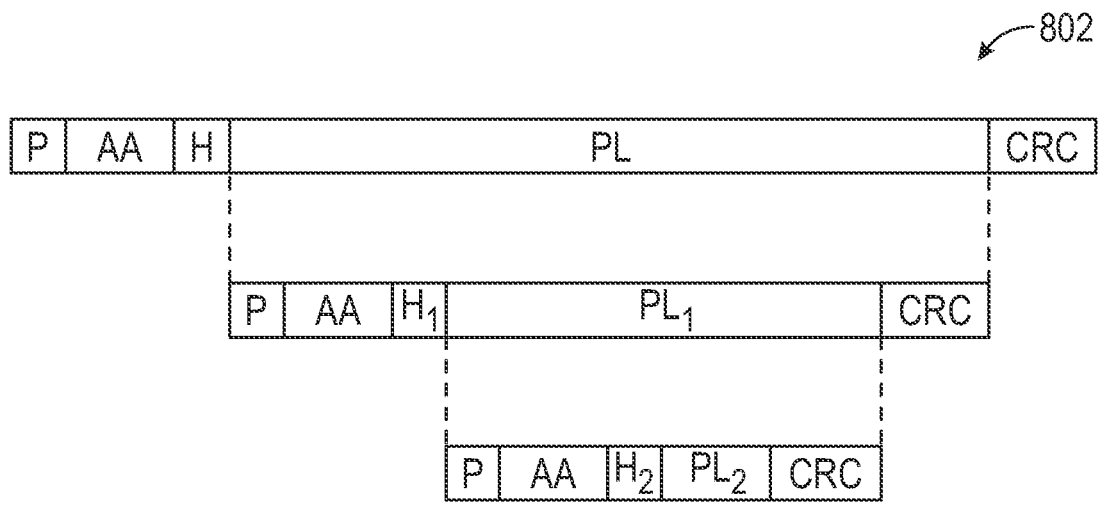
FIG. 8 schematically illustrates a multi-access address data packet having three nested data packets, as well as a plot of curves illustrating improvements in packet error rate and mitigation of attenuation and/or noise.
Figure 8:
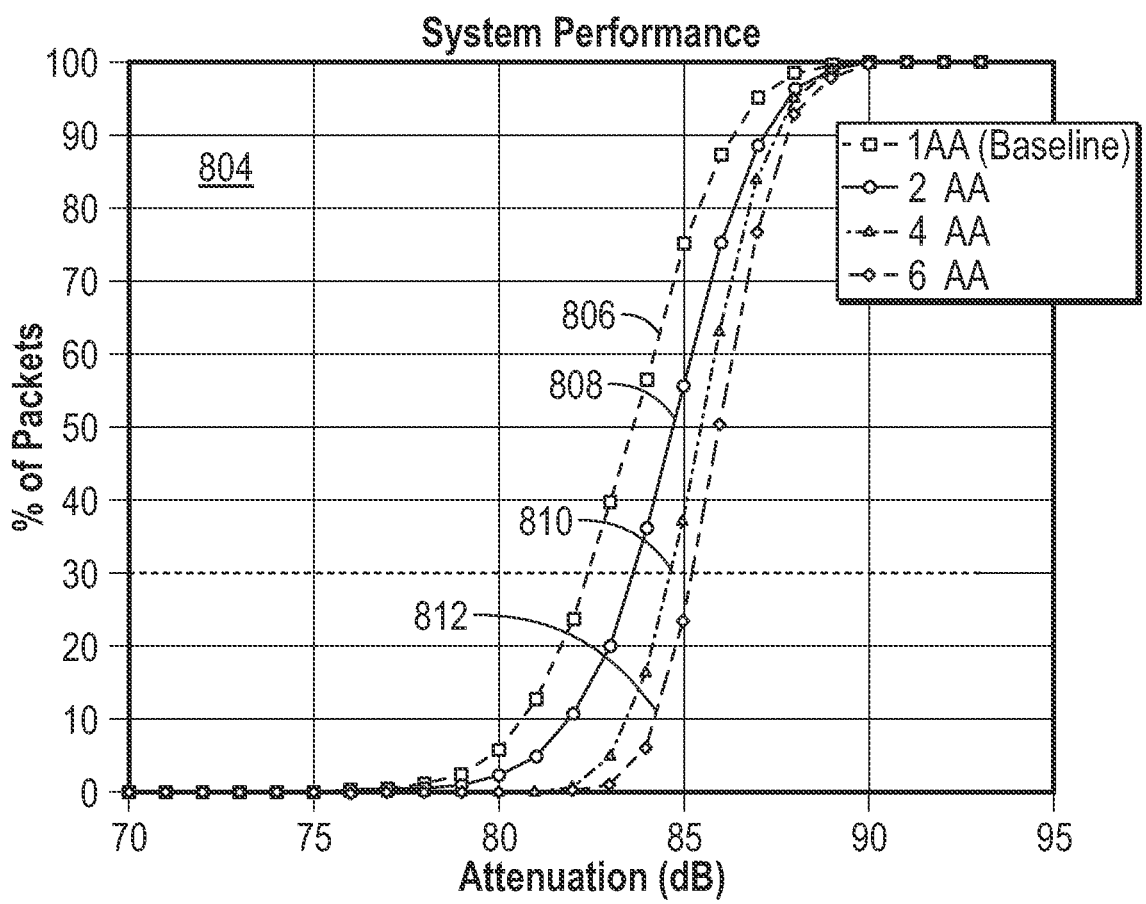

FIG. 8 illustrates the use of multi-AA data packets, such as multi-AA data packet 802 where there are three nested data packets creating three nested access address blocks. To be sure, any number of nested access address blocks can be utilized. A plot 804 illustrates the shift in packet error rate between a data packet with a single access address block 806, two access address blocks 808, four access address blocks 810, and six access address blocks 812. To be sure, as more access address blocks are included the packet error rate is shifted rightward on the attenuation and/or noise axis.

Figure 9:
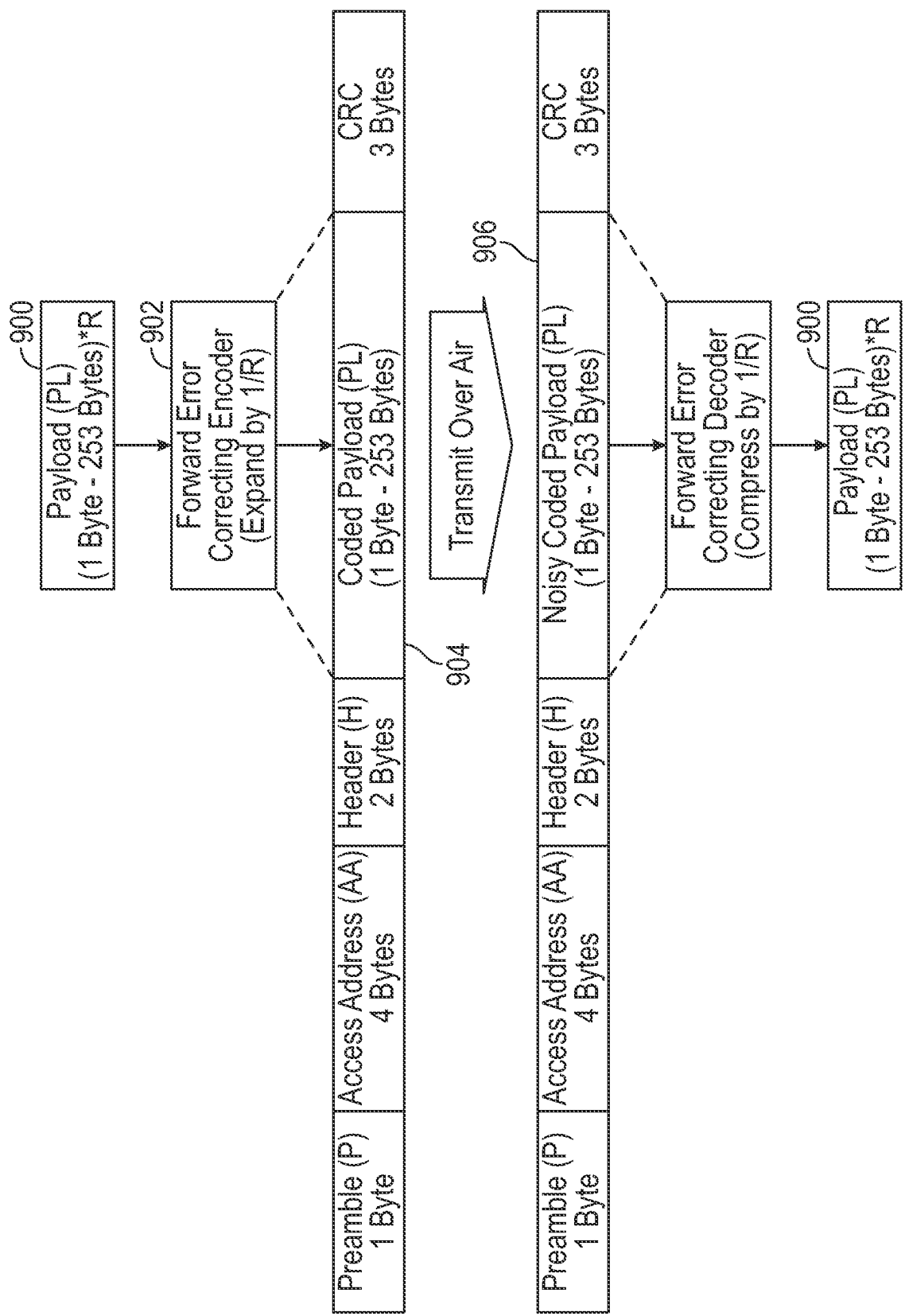
FIG. 9 schematically illustrates a process for encoding a forward error correction code into a payload of data packet.

Referring now to FIG. 9, the block error rate can be improved by coding a payload 900 (such as a nested payload) using Forward Error Correcting codes (FEC 902). The FEC encoder (e.g., transmitter) adds redundancy to the payload before transmission to create a coded payload 904 (effectively expanding the size of the payload). Once a noisy version 906 of the transmitted coded payload has been received, the FEC decoder (e.g., receiver) can correct the errors by mapping the noisy coded payload back to the original payload 900.

Figure 10:
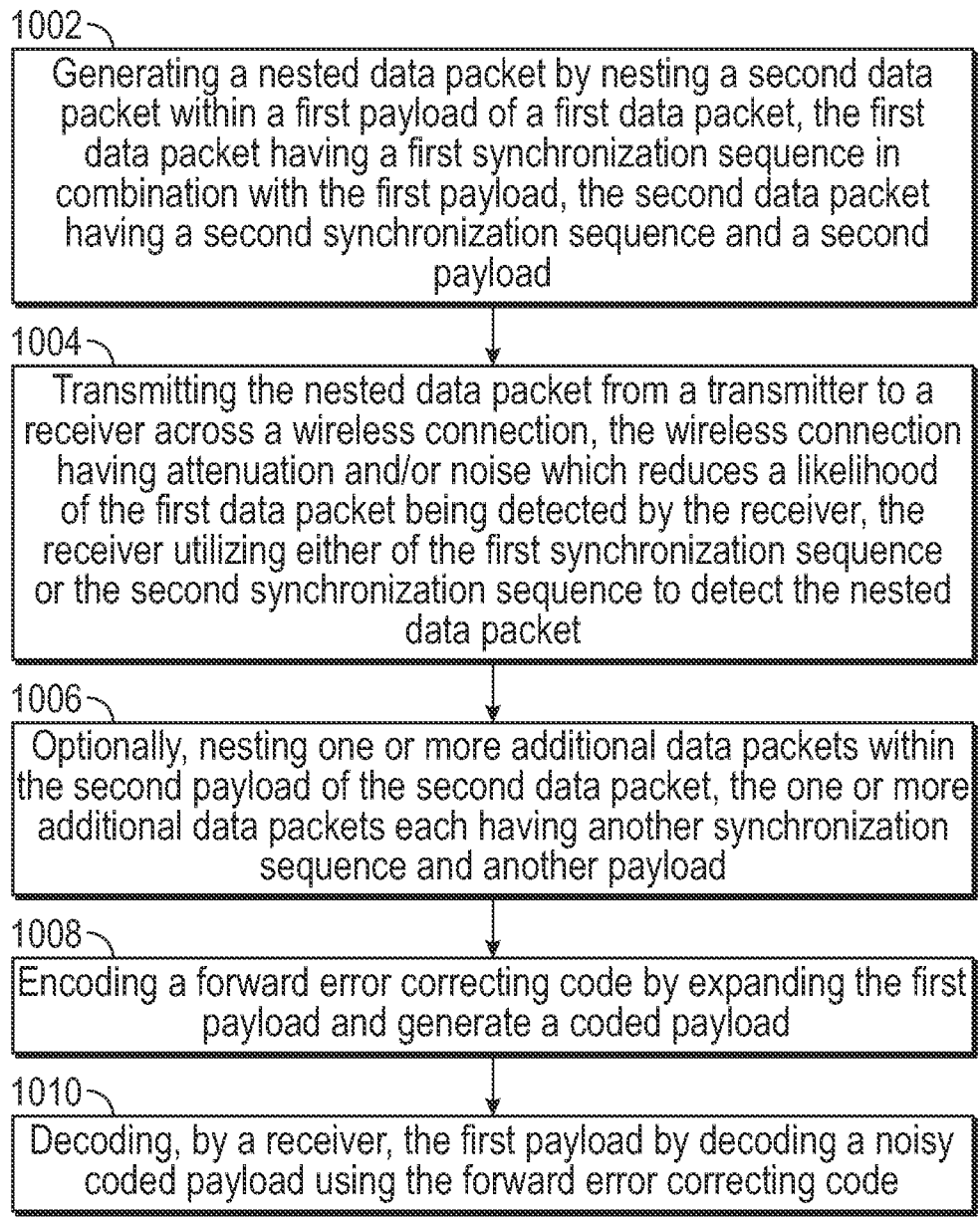
FIG. 10 is a flowchart of an example method of the present disclosure.

FIG. 10 is a flowchart of an example method of the present disclosure performed by a transmitter/encoder. The method can include a step 1002 of generating a nested data packet. In some instances, the nested data packet can be created by nesting a second data packet within a first payload of a first data packet. To be sure, the first data packet comprises a first synchronization sequence in combination with the first payload. The second data packet comprises a second synchronization sequence and a second payload. As noted above, this creates a multi-AA data packet having two access address blocks that increases a likelihood that the multi-AA data packet will be detected by a receiver/decoder.

The method can also include a step 1004 of transmitting the nested data packet from a transmitter to a receiver across a wireless connection. Again, the wireless connection has attenuation and/or noise which reduces a likelihood of the first data packet being detected by the receiver. Thus, the receiver can utilize either the first synchronization sequence or the second synchronization sequence to detect the nested data packet.

In various embodiments, the method can include an optional step 1006 of nesting one or more additional data packets within the second payload of the second data packet, the one or more additional data packets each having another synchronization sequence and another payload. Thus, a multi-AA data packet can have any number of access address blocks that can be used by a receiver/decoder to detect the multi-AA data packet. As attenuation and/or noise increases the number of access address blocks in the multi-AA data packet may be increased to overcome any resultant packet error.

In some instances, the method can include a step 1008 of encoding a forward error correcting code by expanding the first payload (e.g., target payload) and generate a coded payload. The transmission of the data packet with the coded payload results in a receiver receiving a noisy coded payload. Next, the method can include step 1010 of decoding, by a receiver, the first payload (e.g., target payload) by decoding a noisy coded payload using the forward error-correcting code.

Figure 11:
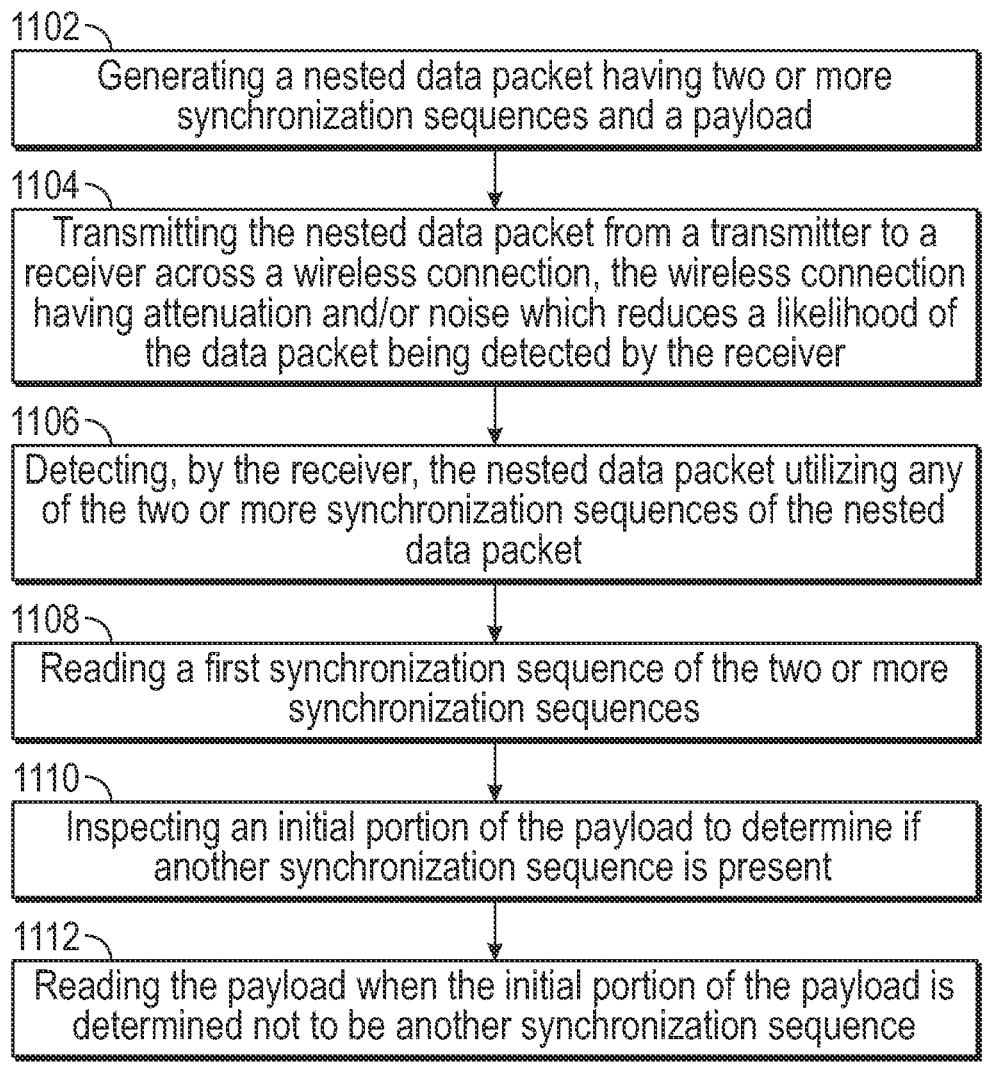
FIG. 11 is a flowchart of another example method of the present disclosure.

FIG. 11 is a flowchart of another example method. The method can include a step 1102 of generating a nested data packet having two or more synchronization sequences and a payload. Thus, multi-AA data packets are created that can have any number of nested synchronization sequences and therefore any number of access address blocks.

Next, the method can include a step 1104 of transmitting the nested data packet from a transmitter to a receiver across a wireless connection. Again, the wireless connection has attenuation and/or noise due to separation between the transmitter and receiver, which reduces a likelihood of the data packet being detected by the receiver. The receiver can utilize any of the two or more synchronization sequences to detect the nested data packet.

The method can include a step 1106 of detecting, by the receiver, the nested data packet utilizing any of the two or more synchronization sequences of the nested data packet. In some embodiments, each of the two or more synchronization sequences comprises at least one of a preamble, an access address, and/or a header. In some embodiments, the payload includes an error correction code.

The method may further include a step 1108 of reading a first synchronization sequence of the two or more synchronization sequences, as well as a step 1110 of inspecting an initial portion of the payload to determine if another synchronization sequence is present. Next, the method can include a step 1112 of reading the payload when the initial portion of the payload is determined not to be another synchronization sequence.

Figure 12:
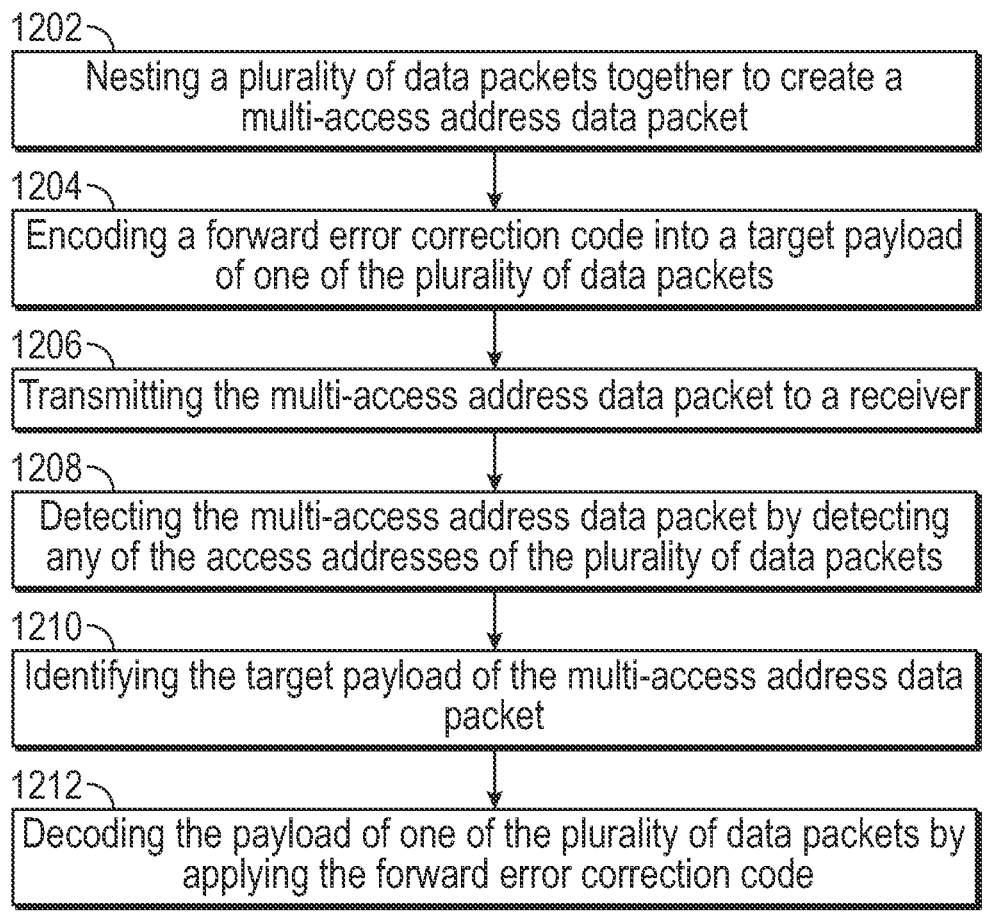
FIG. 12 is a flowchart of yet another example method of the present disclosure.

FIG. 12 is a flowchart of an example method. The method includes a step 1202 of nesting a plurality of data packets together to create a multi-access address data packet. To be sure, each of the plurality of data packets comprising a preamble, an access address, a header, and a payload. Additionally, a data packet of the plurality of data packets can be nested into the payload of another one of the plurality of data packets. The examples provided above provide additional details on packet nesting.

The method also includes a step 1204 of encoding a forward error correction code into a target payload of one of the plurality of data packets. To be sure, the innermost nested data packet has a payload that is smaller in size than the first data packet (or other prior data packets) that the innermost nested data packet is located within. The method includes a step 1206 transmitting the multi-access address data packet to a receiver. The method further includes a step 1208 of detecting the multi-access address data packet by detecting any of the access addresses of the plurality of data packets. An example process for detecting access address blocks is illustrated and described above in FIGS. 6 and 7.

Next, the method includes a step 1210 of identifying the target payload of the multi-access address data packet, as well as a step 1212 of decoding the payload of one of the plurality of data packets by applying the forward error correction code. These steps are illustrated and described above and with respect to FIG. 9.

As noted above, various methods have been described for creating and using nested data packets, also referred to multi-access address data packets. When a nested data packet is received, a particularly configured receiver or device can lock onto or detect one of a plurality of the synchronization sequences of the nested data packet. For example, in FIG. 13, an example nested data packet 1300 is illustrated. The nested data packet 1300 can be transmitted from a transmitter 1301 to a receiver 1303 on a channel 1305.

This nested data packet 1300 can include a first set of blocks 1302 corresponding to standard fields, such as a preamble, that are associated with a wireless protocol, such as BLUETOOTH. Subsequent or after the first set of blocks 1302 is a second set of blocks 1304. The second set of blocks 1304 comprises a plurality of synchronization sequences that each include access address information. In one example, a total number of synchronization sequences are included; however, the number of synchronization sequences is configurable. It will be understood that each of the synchronization sequences are substantially identical in data content and structure to one another. A third set of blocks 1306 corresponds to a payload.

Figure 13:
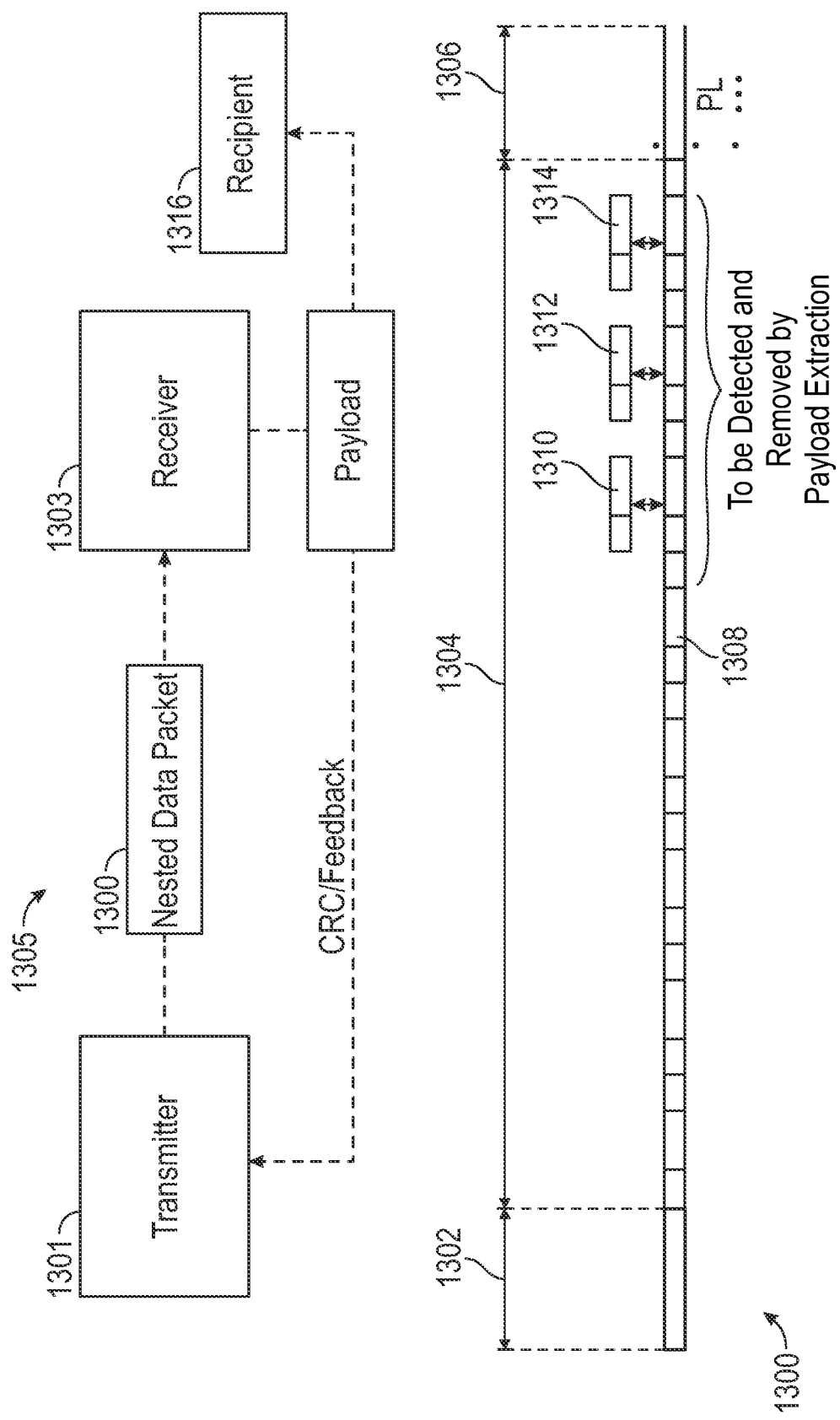
FIG. 13 is a schematic diagram of an example nested data packet with a plurality of synchronization sequences.

The receiver 1303 may detect any one of the eight synchronization sequences in order to acquire the nested data packet. When one of the synchronization sequences is detected, the receiver then may execute a process to extract the payload. It will be understood that it is possible that the synchronization sequence that was detected by the receiver is not the last synchronization sequence in the chain of synchronization sequences (e.g., the synchronization sequence immediately prior to the payload). In the example of FIG. 13, the fifth synchronization sequence 1308 was detected by the receiver, which leaves three additional synchronization sequences 1310, 1312, and 1314 that can be removed to identify or obtain the payload.

According to some embodiments, the receiver 1303 can be configured to identify where the payload is located in the nested data packet, and remove the payload by various methods. In one method, a fixed threshold-based analyses can be used. In another method, an adaptive threshold-based analysis can be used.

With respect to either of these methods, the receiver 1303 can be configured to evaluate and analyze parameters of the synchronization sequence that was detected by the receiver 1303. As noted above, the synchronization sequences are structurally similar (or identical in some instances) to one another. By analyzing the structure of the synchronization sequence that was detected, the receiver can use this structure to compare against additional blocks in the nested data packet to determine if such blocks are likely to be additional synchronization sequences or the payload. Stated otherwise, the detected synchronization sequence has a discernable bit pattern. This bit pattern can be searched over a remainder of the blocks of nested data packet to determine where the payload starts. Once the payload is identified, remaining blocks that can be attributed to synchronization sequences or access address can be removed by the receiver 1303, leaving only the payload. Of course, if the detected access address is the last access address before the payload, no additional access addresses are removed.

When the payload has been extracted, it can be forwarded back to the transmitter 1301 for use in error correction (CRC) or as feedback for advanced error correction purposes. Also, the payload be forwarded to another recipient 1316 such as a network or another device.

The bit pattern parameters can include, but are not limited to, overall length and individual bit value(s). When the bit pattern is determined, the receiver can select whether to utilize a fixed or adaptive analysis to evaluate a remainder of the nested data packet. If the fixed method is selected, the receiver can select m−1 5-byte blocks located at a beginning of the received data payload which potentially could be additional access addresses, and calculate a hamming distance of each block compared to the access address in the detected synchronization sequences. Selection of the fixed method may occur when a channel quality estimate is available in which case, the adaptive threshold can be used. If no information is known about the channel, a fixed threshold may be used. If the fixed method is selected, the receiver can use hamming distance analysis to identify multiples of 5-byte blocks as the synchronization sequences and locate the received data payload at the end of these sequences.

In some instances, a threshold value is used in the comparison. For example, if there is at least approximately 80% similarity (i.e., hamming distance is less than 8) between a block being analyzed and the bit pattern of the detected access address, then the receiver can determine that the block is an access address and remove the block. If, on the other hand, there is not 80% similarity, the receiver can stop and return a remaining part of the frame (e.g., remainder of the nested data packet) as the payload. To add robustness against false negatives, the receiver 1303 can be configured to check for two consecutive 5-byte blocks with less than approximately 80% similarity before the receiver determines the block(s) to be part of the payload.

As noted above, rather than using a fixed method of analysis, an adaptive analysis can be used by the receiver 1303. In general, the nested data packet is transmitted over a wireless channel or communications link (generally a "channel"), which may have attenuation due to noise or other types of interference. The channel attenuation may cause signal degradation or other deleterious effects.

In some instances, the threshold used when comparing bit pattern of the detected access address can be changed dynamically based on channel attenuation. That is, the threshold can be increased or decreased as the quality of the channel changes.

Figure 14:
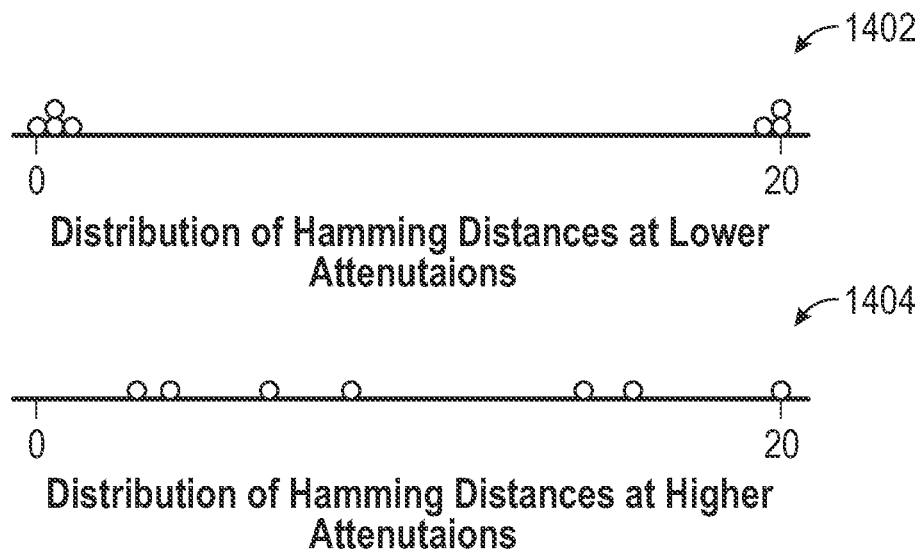
FIG. 14 illustrates example distributions of hamming distances for a communications channel based on channel attenuation.

In some embodiments, the receiver 1303 can detect attenuation level in the channel 1305. The receiver 1303 can select or adjust the threshold used in the comparison process based on the attenuation level. As attenuation rises, errors may be introduced into the nested data packet, such as in the multiple access address packets. At lower attenuations (i.e., when the channel is cleaner as illustrated in FIG. 2, which could be less than 75 dB in some instances) the access addresses may have fewer errors and hence, instead of a fixed similarity threshold of approximately 80% the receiver can use a more conservative threshold of approximately 90%. FIG. 14 illustrates attenuation levels of the channel 1305. A first linear distribution graph 1402 of hamming distances includes when attenuation levels are low is compared against a second linear distribution graph 1404 hamming distances when attenuation levels are higher.

Referring back to FIG. 13, at higher attenuations, the access address blocks may have more errors and hence the receiver 1303 can adjust the threshold down a lower level, such as approximately 60%. Again, these threshold value selections are not intended to be limiting, but are merely for explanatory purposes.

The receiver 1303 can be configured to select the threshold value using an algorithm as set forth below. Initially, the receiver 1303 can calculate a hamming distance for seven blocks of five bytes (i.e., candidate access addresses), denoted by $d\_1, \ldots, d\_7$. Hamming distances are calculated using bit-wise analysis that includes comparing the detected address access block bit pattern to these additional blocks.

The receiver 1303 then sets a threshold th by calculating th=a*(Avg(d_i)+b) where an average term Avg(d_i) is only calculated over the d_i's that are smaller than a distance averaging filtration parameter c. In some embodiments, the distance averaging filtration parameter c is equal to 80, but this value can be set according to design requirements. Also, the receiver can set threshold calculation parameters a and b to default values where a=3/2 and b=3.

Next, the receiver 1303 initializes a scoring process for each of the blocks. For 1≤k≤7, the receiver 1303 determines when d_k<=th: step_score[k]=step_score[k−1]+1. Otherwise, the receiver 1303 scores the block as step_score[k]= step_score[k−1]−1. The receiver 1303 can determine a number of access address blocks to be removed as argmax_k step_score[k]. Thus, blocks with scores above the threshold are identified as access address blocks.

Figure 15:
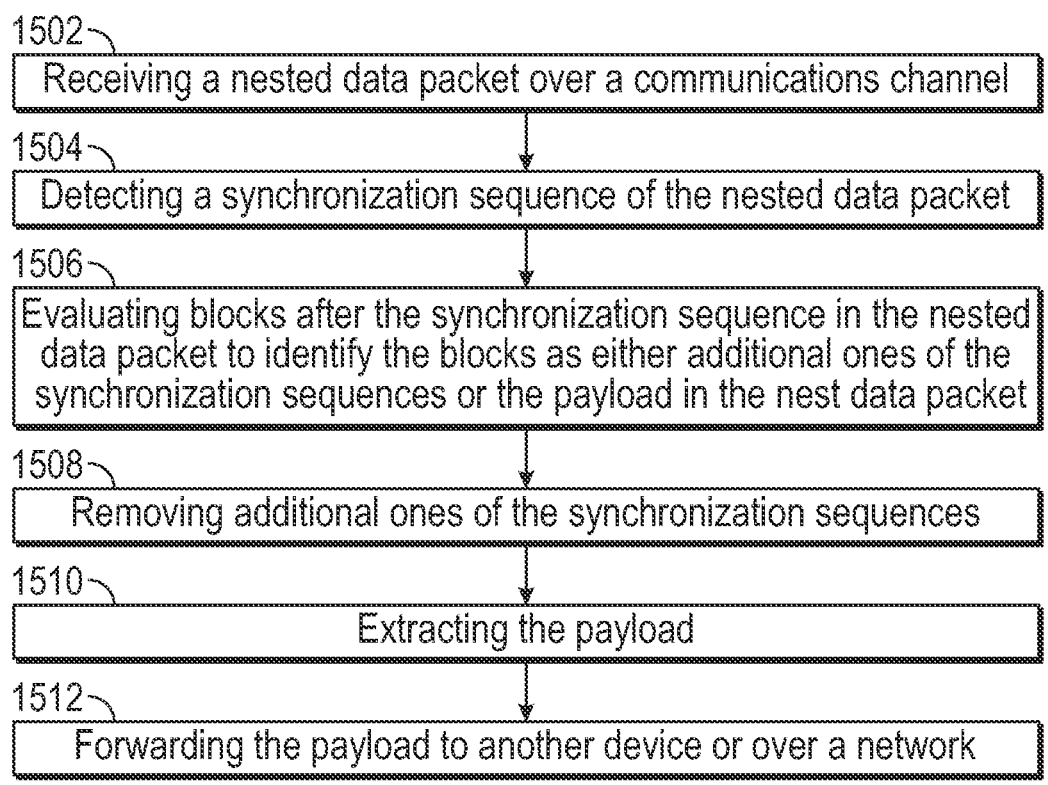
FIG. 15 is a flowchart of an example method of extracting a payload.

FIG. 15 is a flowchart of an example method. The method can include a step 1502 of receiving a nested data packet over a communications channel. The method can include a step 1504 of detecting a synchronization sequence of the nested data packet. As noted above, the nested data packet comprises synchronization sequences placed in series ahead of a payload. Again, an example packet can include eight synchronization sequences. In some instances, an entire synchronization sequence may not be used and only access addresses may be used. Thus, while a synchronization sequence includes an access address, it may also include other data. In some instances, the nested data packet may be constructed to include only a plurality of access address blocks. Again, the number of synchronization sequences and/or address blocks may vary according to design requirements.

The method can also include a step 1506 of evaluating blocks after the synchronization sequence in the nested data packet to identify the blocks as either additional ones of the synchronization sequences or the payload in the nested data packet. The method can include a step 1508 of removing additional ones of the synchronization sequences which allows for a step 1510 of extracting the payload. In some instances, the method can include a step 1512 of forwarding the payload to another device or over a network. The payload can also be forwarded back to the transmitter for use in error correction or other feedback loops.

An example method for comparing a detected synchronization sequence or access address block to other blocks in the nested data packet can include a step of determining a structure (e.g., bit pattern) of the synchronization sequence/ access address. Next, the method includes a step of searching forward in the nested data packet for data that matches the structure of the synchronization sequence using a threshold. The searching can include comparing blocks of data in the nested data packet to the bit pattern of the detected access address. When the data of a block has a structure that does not match the structure of the synchronization sequence, the block can be identified as a part of the payload. When the data of a block has a structure that does match the structure of the synchronization sequence (within the threshold selected), the block can be identified as another access address block.

Figure 16:
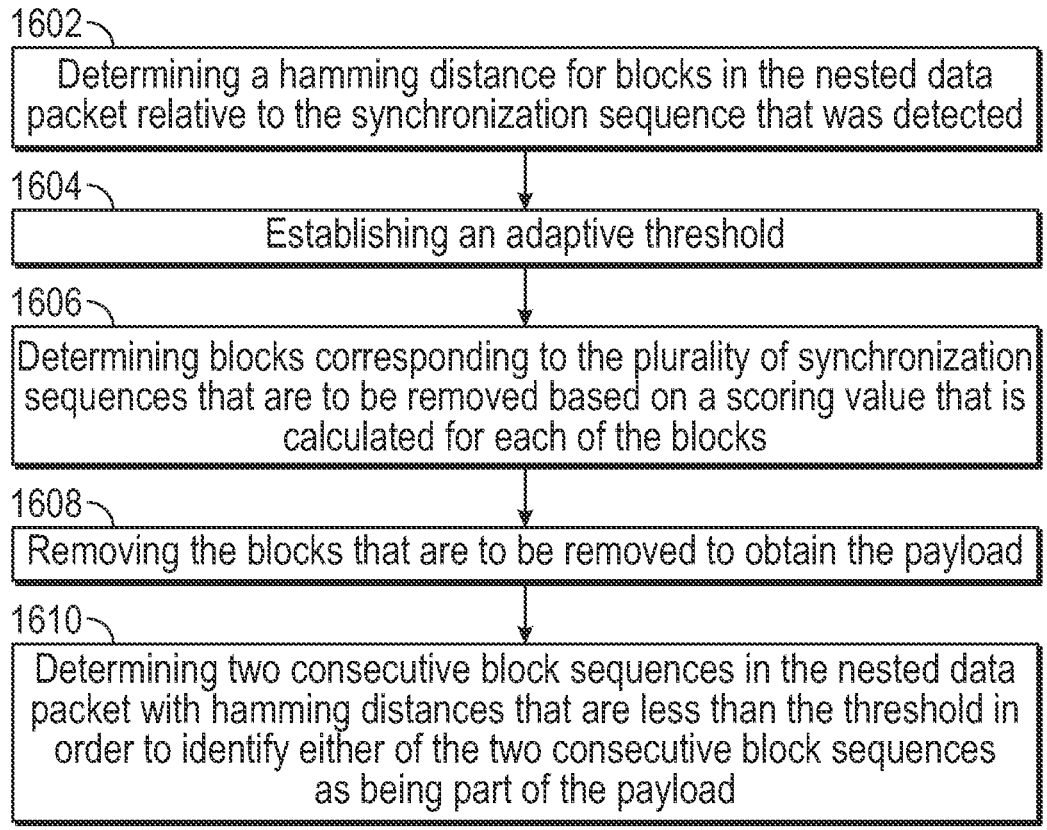
FIG. 16 is a flowchart of an additional example method of extracting a payload.

FIG. 16 is a flowchart of an example method. The method can comprise a step 1602 of determining a hamming distance for blocks in the nested data packet relative to the synchronization sequence that was detected. The method can include a step 1604 of establishing the adaptive threshold. Again, the adaptive threshold is applied to blocks having a hamming distance below a distance averaging filtration parameter. In some instances, the method can include a step 1606 of determining blocks corresponding to the plurality of synchronization sequences that are to be removed based on a scoring value that is calculated for each of the blocks, as well as a step 1608 of removing the blocks that are to be removed to obtain the payload. To be sure, when a block sequence is identified as one of the two or more synchronization sequences, the block sequence is removed. Conversely, when a block sequence is identified as a part of the payload, a remainder of the nested data packet is extracted as the payload. As noted above, in order to avoid false positives, the method can include a step 1610 of determining two consecutive block sequences in the nested data packet with hamming distances that are less than the threshold in order to identify either of the two consecutive block sequences as being part of the payload.

Figure 17:
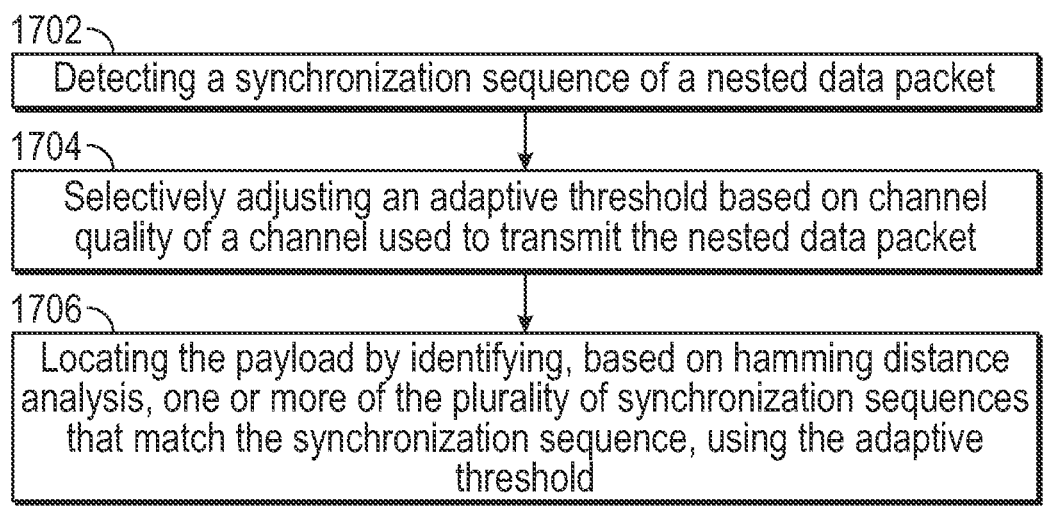
FIG. 17 is a flowchart of a method for extracting a payload using an adaptive threshold based on channel attenuation.

FIG. 17 is another flowchart of an example method. The method can include a step 1702 of detecting a synchronization sequence of a nested data packet. Again, the nested data packet comprises a plurality of synchronization sequences placed in series ahead of a payload. Next, the method can include a step 1704 of selectively adjusting an adaptive threshold based on channel quality of a channel used to transmit the nested data packet. The threshold can be adjusted downwardly and proportionally with an increase in the attenuation on the channel.

The method can include a step 1706 of locating the payload by identifying, based on hamming distance analysis, one or more of the plurality of synchronization sequences that match the synchronization sequence, using the adaptive threshold. Again, this comparison can be made based on calculated hamming distances for blocks relative to a fixed or adaptive threshold.

Figure 18:
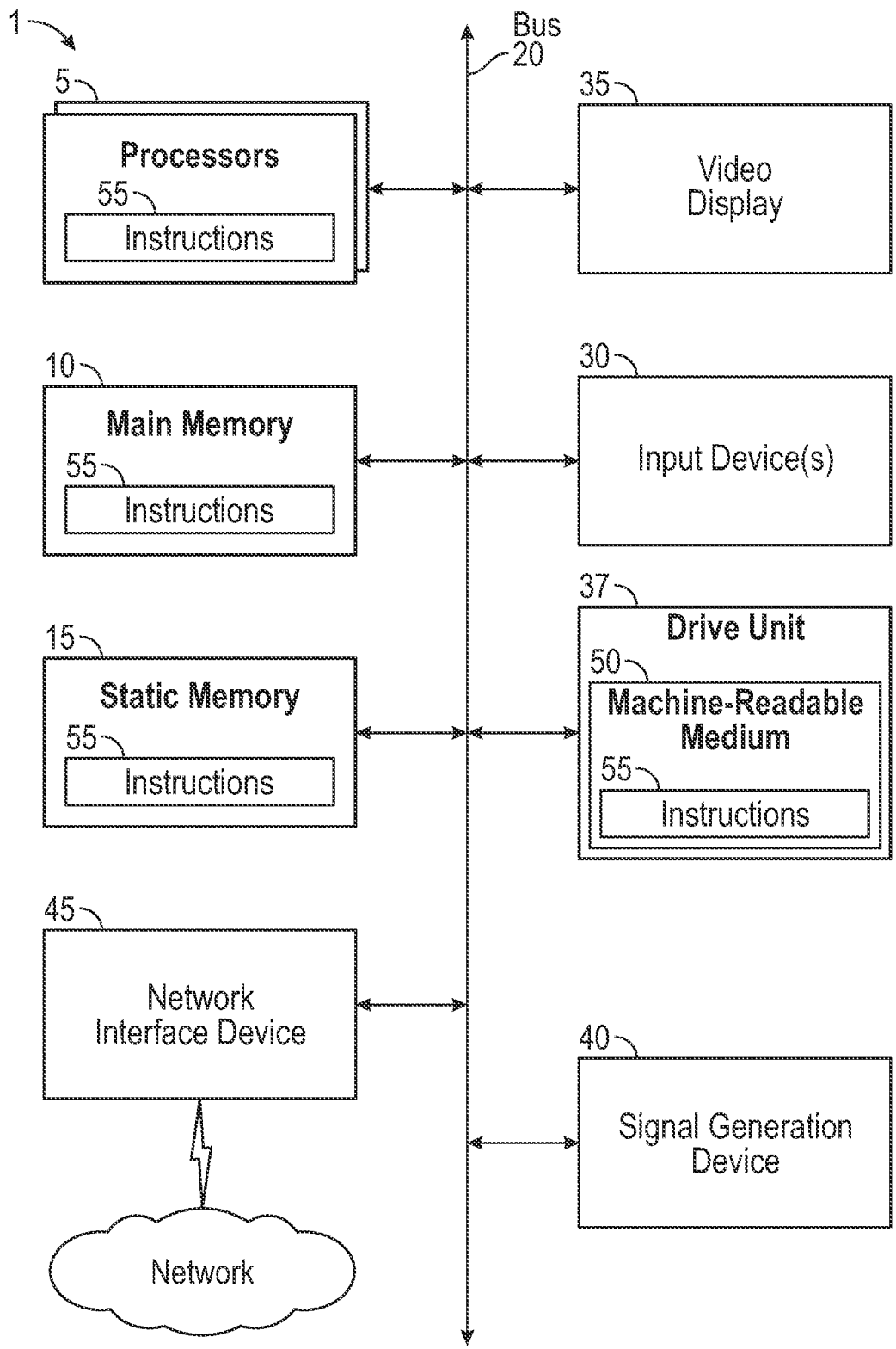
FIG. 18 is a schematic diagram of an exemplary computer system that is used to implement embodiments according to the present technology.

FIG. 18 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be an Internet-of-Things device or system, a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are well known in the art. Thus, the computer system 1 can be an Internet-of-Things device or system, a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer device 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications, as well as wireless communications (both short-range and long-range). Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the

What is claimed is:

1. A method, comprising:
   detecting a synchronization sequence of a nested data packet, the nested data packet comprising synchronization sequences placed in series ahead of a payload, the synchronization sequences including the synchronization sequence;
   evaluating blocks after the synchronization sequence in the nested data packet to identify the blocks as either additional ones of the synchronization sequences or the payload in the nested data packet, the evaluation of the blocks after the synchronization sequence comprising:
      determining a hamming distance for the blocks in the nested data packet relative to the synchronization sequence;
      establishing an adaptive threshold, the adaptive threshold being applied to blocks having a hamming distance below a distance averaging filtration parameter;
      determining blocks corresponding to the synchronization sequences that are to be removed based on a scoring value that is calculated for each of the blocks; and
      removing the blocks that are to be removed to obtain the payload; and
   extracting the payload.

2. The method according to claim 1, further comprising extracting the additional ones of the synchronization sequences.

3. The method according to claim 1, further comprising:
   determining a structure of the synchronization sequence; and
   searching forward in the nested data packet for data that matches the structure of the synchronization sequence using a threshold.

4. The method according to claim 3, further comprising identifying the data as a part of the payload when the data has a structure that does not match the structure of the synchronization sequence.

5. The method according to claim 1, wherein when a block is identified as one of the synchronization sequences that are to be removed, the block is removed.

6. The method according to claim 1, wherein when a block is identified as a part of the payload, a remainder of the nested data packet is extracted as the payload.

7. The method according to claim 1, further comprising determining two consecutive block sequences in the nested data packet with hamming distances that are less than the threshold in order to identify either of the two consecutive block sequences as being part of the payload.

8. A method comprising:
   detecting a synchronization sequence of a nested data packet, the nested data packet comprising a plurality of synchronization sequences placed in series ahead of a payload;
   selectively adjusting an adaptive threshold based on channel quality of a channel used to transmit the nested data packet;
   locating the payload by identifying, based on hamming distance analysis, one or more of the plurality of synchronization sequences that match the synchronization sequence, using the adaptive threshold;
   determining hamming distances for blocks in the nested data packet relative to the synchronization sequence;
   establishing the adaptive threshold, the adaptive threshold being applied to blocks having a hamming distance below a distance averaging filtration parameter;
   determining the adaptive threshold using: $th = a*(Avg(d\_i) + b)$ where a and b are threshold calculation parameters set to a desired value, d is the hamming distance for the blocks and i is the ith block, and where an average term $Avg(d\_i)$ is applied when $d\_i$ is smaller than the distance averaging filtration parameter;
   determining blocks corresponding to the plurality of synchronization sequences that are to be removed based on a scoring value that is calculated for each of the blocks; and
   removing the blocks that are to be removed to obtain the payload.

9. The method according to claim 8, wherein the distance averaging filtration parameter is selectable.

10. The method according to claim 8, further comprising transmitting the payload to a receiver.

11. A device, comprising:
    a processor; and
    a memory for storing instructions, the processor configured to execute the instructions to:
       detect an access address of a nested data packet, the nested data packet comprising access addresses placed in series ahead of a payload, the access addresses comprising the access address;
       evaluate blocks after the access address in the nested data packet to identify the blocks as either additional ones of the access addresses or the payload in the nested data packet using a threshold comparison;
       extract the payload;
       determine a hamming distance for the blocks in the nested data packet;
       establish an adaptive threshold, the adaptive threshold being applied to blocks having a hamming distance below a distance averaging filtration parameter;
       determine blocks corresponding to the access addresses that are to be removed based on a scoring value that is calculated for each of the blocks; and
       remove the blocks that are to be removed to obtain the payload.

12. The device according to claim 11, wherein the processor is further configured to execute instructions selectively adjust the threshold based on channel quality.

13. The device according to claim 11, wherein the processor is further configured to execute instructions to:
    determine a bit pattern of the access address; and
    search forward in the nested data packet for data in the blocks that matches the bit pattern of the access address using a threshold.

14. The device according to claim 13, wherein the processor is further configured to execute instructions to identify the data as a part of the payload when the data in the blocks has a structure that does not match the structure of the access address in view of the threshold.

15. A method comprising:
- identifying a detected access address of a nested data packet comprising a plurality of access addresses placed in series ahead of a payload;
- calculating a hamming distance for a plurality of blocks, each comprising five bytes, using the detected access address;
- setting a threshold th=a*(Avg(d_i)+b) where a and b are threshold calculation parameters set to a desired value, d is the hamming distance for the blocks and i is the ith block, and where an average term Avg(d_i) is calculated over the d_i values that are smaller than a distance averaging filtration parameter c;
- scoring the plurality of blocks to determine a number of access address blocks to be removed; and
- obtaining the payload by removing at least a portion of the plurality of blocks based on the scoring.

* * * * *